No. 769,119. PATENTED AUG. 30, 1904.
C. M. STRICKLAND.
FRYING KETTLE.
APPLICATION FILED JAN. 22, 1904.
NO MODEL.
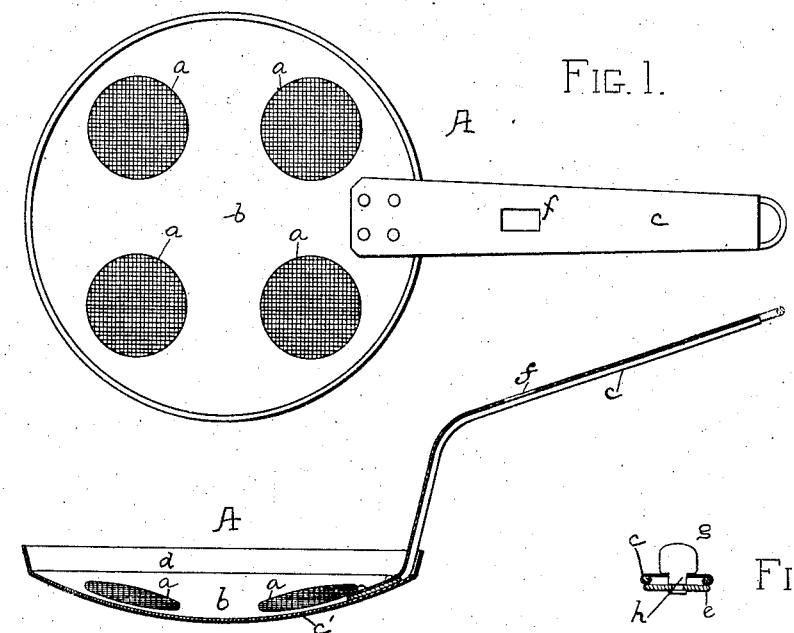
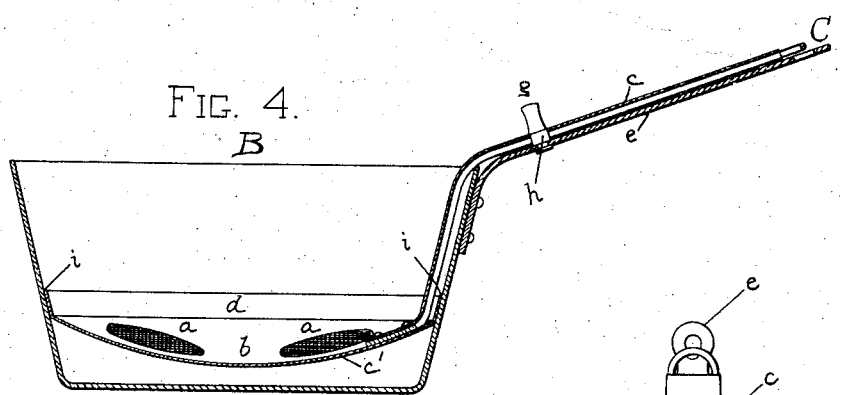
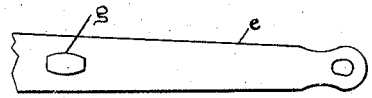
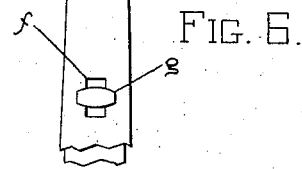
WITNESSES
Thomas F. Moore
Harold Valkey
INVENTOR
Clarence M. Strickland
by his attorney
James E. Odlin No. 769,119. Patented August 30, 1904.

UNITED STATES PATENT OFFICE.

CLARENCE M. STRICKLAND, OF LYNN, MASSACHUSETTS.

FRYING-KETTLE.

SPECIFICATION forming part of Letters Patent No. 769,119, dated August 30, 1904.

Application filed January 22, 1904. Serial No. 190,212. (No model.)

*To all whom it may concern:*

Be it known that I, CLARENCE M. STRICKLAND, of Lynn, in the county of Essex and State of Massachusetts, have invented new and useful Improvements in Frying-Kettles, of which the following, taken in connection with the accompanying drawings, is a specification.

My invention relates to the combination of a long-handled false bottom with a frying-kettle specially adapted for use in frying or cooking clams, oysters, or other food, the combination of said false bottom with the kettle for separate use in cooking, and the combination of the handle of above-described false bottom locked with the handle of the kettle for joint use in cooking.

The object of my invention is to provide a new and improved kettle with locked or separate handles for frying or cooking clams or other food in heated fat or other liquid at an even temperature free from impurities and to prevent the discoloring of the heated fat or liquid in which clams or other food is cooked by contact with burned or blackened crumbs or batter and to furnish a strainer useful in draining and delivering the cooked clams or other food after cooking and in removing and draining crumbs or batter resulting from the cooking process from the heated fat or liquid, so that it is suitable for further use in cooking. There results from frying or cooking with my improved kettle a food product in very appetizing and palatable form, a most economical use of heated fat or other liquid, and greater convenience in the use of utensils.

I obtain these objects by the apparatus illustrated in the accompanying drawings, in which—

Figure 1 is a plan view of saucer-shaped false bottom and handle. Fig. 2 is a vertical section of false bottom and handle. Fig. 3 is a perspective view of key locked by being turned at right angles to the handles of false bottom and frying-kettle. Fig. 4 is a vertical section of my improved frying-kettle. Fig. 5 is a plan view of handle of frying-pan and key. Fig. 6 is a plan view of handles of frying-pan and false bottom locked by key turned at right angles, locking them and forming one firm handle.

Similar letters of reference indicate corresponding parts.

The false bottom A has one or more sections $a$ thickly perforated with small holes and having a handle $c$. Bottom A has center $b$, which is the lowest part of said false bottom and is solid. The saucer-shaped part of the false bottom A, of which $b$ is the center, is $c'$ and has above it a rim $d$, which fits closely the sides of the kettle B at the points of contact $i$. The false bottom A is filled with clams which have been breaded with bread-crumbs or with batter and is placed in the kettle B, which has been filled with heated fat of sufficient quantity to cover the clams, and the frying-kettle is placed upon the fire.

Impurities in the heated fat or other liquid used as the violent boiling ensues tend to pass upward, but are prevented from coming in contact with the clams or other food by the thin meshes of the perforated sections $a$ of the saucer-shaped part $c'$. Meanwhile the clams or other food are confined above the false bottom A and are slowly cooked or fried in an even temperature and are thoroughly and evenly fried or cooked. The crumbs or batter with which the clams are breaded would in an ordinary kettle be in part removed by the action of boiling fat or other liquid and, passing to the bottom of the kettle B, would some of them become blackened and burned, and some would stick to the bottom of the kettle and be removed by a stirring of the heated fat or by the action of the fat in boiling. The heated fat or other liquid would thus become discolored and blackened and would in turn discolor and blacken the frying clams or other food being fried or cooked and make them unpleasant to the eye and unpalatable to the taste. No crumbs or batter can fall through the sieve-like surfaces of the perforated parts of the false bottom A of my improved frying-kettle, while the evenly-cooked fried clams or other food product is handsomely browned and most appetizing, as well as palatable. The heated fat or other liquid should be immediately drained off while it is hot from the fried clams or other food in order that as little grease as possible may be on the food product.

The locked handle in my improved frying-kettle comprises two ordinary flat handles $c$ and $e$, one of which is connected with the frying-kettle B and one with the false bottom A. The handle $c$ is provided with a slot $f$, which fits over the key $g$ in the handle of the kettle B. The handle $e$ of the frying-kettle B has a key $g$, the shank $h$ of which equals in length the thickness of the two handles $c$ and $e$ combined as they are laid together in Figs. 3, 4, and 6. When turned either to the right or left after having been passed through the slot $f$, the key $g$ locks the handles $c$ and $e$. Thus locked they form one firm handle C for removing my improved frying-kettle from the range and lifting it about and tend to prevent the kettle accidentally overturning.

The clams or other food having become fried or cooked, the handles $c$ and $e$ are unlocked by turning the key $g$, parallel with the sides of the slot $f$, and by taking $c$ up and apart from $e$ and over $g$ the handles $c$ and $e$ are freed. The handle $c$ is then lifted up, and the fried or cooked contents of the false bottom A are drained over the fat in the kettle B and are removed by gently tipping the bowl made up of the saucer $c$ and the rim $d$ and so delivering its contents into a dish or jar.

The crumbs are now remaining in the center $b$ of the saucer $c$. The heated fat or other liquid may be drained from them by a sidewise motion of A and then thrown out, and my improved kettle is ready for further service. The heated fat or other liquid is left clean and unblackened and suitable for further use, which constitutes a great saving in the costs of the frying process.

What I claim as my invention is—

1. The combination of a frying-kettle B having a handle $e$, with a false bottom A, consisting of a saucer-shaped part or surface $c$ solid at its lowest part $b$ and provided with one or more sections $a$ perforated with many small holes and having a rim $d$ closely fitting the sides of the frying-kettle B at the points $i$ and a handle $c$ substantially as described.

2. The combination of a frying-kettle B having a handle $e$ provided with a key $g$ with a false bottom A consisting of a saucer-shaped part or surface $c$ solid at its lowest part $b$ and provided with one or more sections $a$ perforated with many small holes and having a rim $d$ closely fitting the sides of the frying-kettle B at the points $i$ and having a handle $c$ provided with a slot $f$ fitting over the key $g$ of the handle $e$ that $g$ may be turned at right angles to $c$ locking the two handles $c$ and $e$ substantially as described for the purpose indicated.

In testimony whereof I have signed my name to this specification, in the presence of two subscribing witnesses, on this 20th day of January, A. D. 1904.

CLARENCE M. STRICKLAND

Witnesses:
 THOMAS F. MOORE,
 HERBERT W. MURKLAND.